US008527897B2

(12) United States Patent  (10) Patent No.: US 8,527,897 B2
Eischeid et al.  (45) Date of Patent: Sep. 3, 2013

(54) SYSTEM, METHOD, AND COMPUTER PROGRAM PRODUCT FOR TOGGLING BACK AND FORTH BETWEEN UNFORMATTED AND FORMATTED EDITABLE VIEWS OF DATA

(75) Inventors: Todd Michael Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/360,021

(22) Filed: Jan. 26, 2009

(65) Prior Publication Data

US 2010/0192076 A1   Jul. 29, 2010

(51) Int. Cl.
 *G06F 3/048* (2013.01)
(52) U.S. Cl.
 USPC ........... 715/780; 715/221; 715/224; 715/225; 715/764
(58) Field of Classification Search
 USPC .................. 715/764, 780, 225, 221, 224, 272
 See application file for complete search history.

(56) References Cited

U.S. PATENT DOCUMENTS

| | | | | |
|---|---|---|---|---|
| 5,247,611 A * | 9/1993 | Norden-Paul et al. | ......... | 715/217 |
| 5,995,984 A * | 11/1999 | Lau et al. | ....................... | 715/213 |
| 6,598,043 B1 * | 7/2003 | Baclawski | .............................. | 1/1 |
| 6,931,574 B1 * | 8/2005 | Coupal et al. | .................... | 714/39 |
| 7,107,546 B2 * | 9/2006 | Coulthard | ..................... | 715/780 |
| 7,278,113 B1 * | 10/2007 | Racine et al. | .................. | 715/780 |
| 7,725,834 B2 * | 5/2010 | Bell et al. | ........................ | 715/764 |
| 7,836,407 B2 * | 11/2010 | Pettinati | ......................... | 715/780 |
| 7,984,387 B2 * | 7/2011 | Batthish et al. | ................ | 715/812 |
| 8,141,107 B2 * | 3/2012 | Obeid et al. | ..................... | 719/329 |
| 2004/0039989 A1 * | 2/2004 | Warren | .......................... | 715/505 |
| 2004/0073868 A1 * | 4/2004 | Easter et al. | .................... | 715/507 |
| 2004/0109453 A1 * | 6/2004 | Wirth | ............................ | 370/393 |
| 2004/0117731 A1 * | 6/2004 | Blyashov | ........................ | 715/507 |
| 2004/0205526 A1 | 10/2004 | Borodovski et al. | ........... | 715/505 |
| 2004/0237030 A1 * | 11/2004 | Malkin | ............................ | 715/505 |
| 2005/0198563 A1 | 9/2005 | Kristjansson | .................. | 715/507 |
| 2006/0044605 A1 | 3/2006 | Schneider et al. | ............. | 358/1.15 |
| 2006/0206801 A1 | 9/2006 | Maxwell et al. | ................ | 715/507 |
| 2006/0235690 A1 * | 10/2006 | Tomasic et al. | ................ | 704/257 |
| 2007/0074130 A1 * | 3/2007 | Folting et al. | .................. | 715/792 |
| 2007/0083811 A1 * | 4/2007 | Matsuo et al. | ................. | 715/530 |
| 2008/0028289 A1 | 1/2008 | Hicks et al. | ..................... | 715/224 |
| 2008/0028333 A1 * | 1/2008 | Perelman et al. | .............. | 715/780 |
| 2008/0072170 A1 | 3/2008 | Simons | .......................... | 715/769 |
| 2008/0072243 A1 * | 3/2008 | Obeid et al. | .................... | 719/329 |
| 2008/0222548 A1 * | 9/2008 | Cohen et al. | .................... | 715/770 |
| 2008/0276193 A1 * | 11/2008 | Pettinati | ......................... | 715/780 |
| 2009/0019351 A1 * | 1/2009 | Hitchcock et al. | ............. | 715/222 |
| 2011/0202824 A1 * | 8/2011 | Raje | .............................. | 715/224 |

* cited by examiner

*Primary Examiner* — Tadeese Hailu
(74) *Attorney, Agent, or Firm* — Zilka-Kotab, PC

(57) ABSTRACT

A method according to one embodiment includes outputting several data elements in a raw view in which all of the data elements are selectable by a single action; allowing editing of the data elements in the raw view; outputting the data elements in a formatted view in which the data elements are positioned in individual fields; allowing editing of the data elements in the formatted view; and toggling back and forth between the raw view and the formatted view. Additional systems, methods, and computer program products are also disclosed.

17 Claims, 5 Drawing Sheets

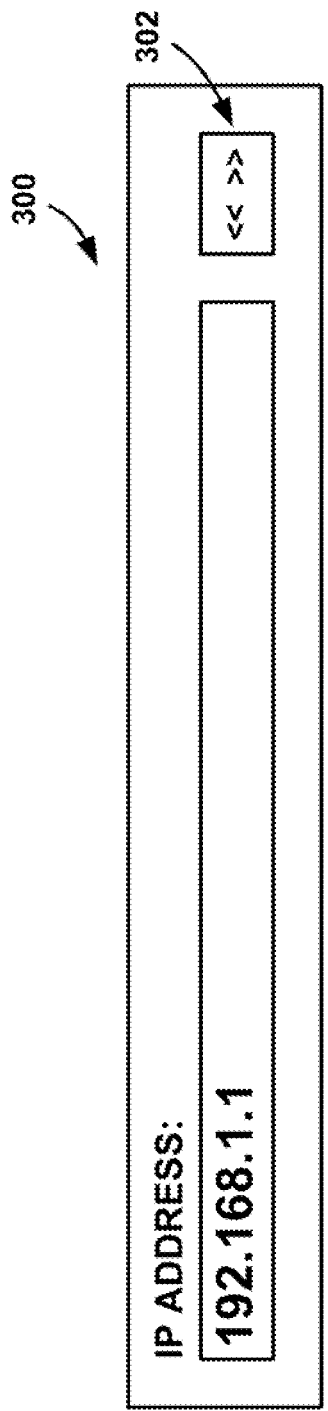
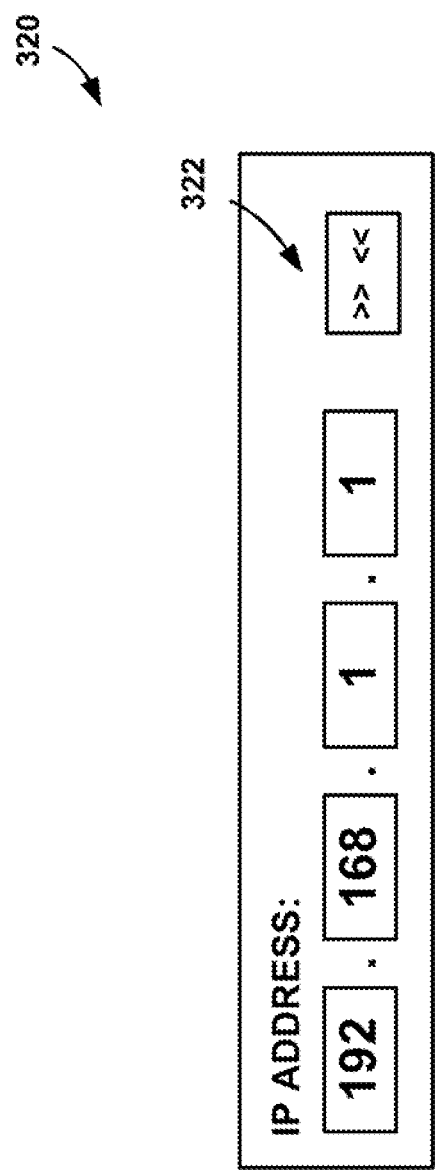
FIG. 3A
FIG. 3B

SYSTEM, METHOD, AND COMPUTER PROGRAM PRODUCT FOR TOGGLING BACK AND FORTH BETWEEN UNFORMATTED AND FORMATTED EDITABLE VIEWS OF DATA

BACKGROUND

The present invention relates to data entry systems, and more particularly, this invention relates to entering data with complex formatting.

Data entry in technical applications, such as those used by information technology administrators, often involves entering fields with complex formatting, such as internet protocol (IP) addresses or operating system installation keys. As the complexity of the data to be entered increases, the chance for human error when entering that data increases.

In some cases, this may be avoided by using a copy and paste operation. However, the user interface being implemented may not always allow pasting of all of the data. For example, in the context of IP addresses, if a separate text box is used for each octet of the IP address, the user may be forced to manually key in each value. If, on the other hand, a single text box is used, pasting in a value may be possible at the expense of readability.

SUMMARY

A method according to one embodiment includes outputting several data elements in a raw view in which all of the data elements are selectable by a single action; allowing editing of the data elements in the raw view; outputting the data elements in a formatted view in which the data elements are positioned in individual fields; allowing editing of the data elements in the formatted view; and toggling back and forth between the raw view and the formatted view.

A computer program product for outputting data according to one embodiment includes a computer usable medium having computer usable program code embodied therewith. The computer usable program code includes computer usable program code configured to output several data elements in a raw view in which all of the data elements are selectable by a single action; computer usable program code configured to allow editing of the data elements in the raw view; computer usable program code configured to output the data elements in a formatted view in which the data elements are positioned in individual fields; computer usable program code configured to allow editing of the data elements in the formatted view; and computer usable program code configured to toggle between the raw view and the formatted view.

A method according to one embodiment includes outputting several data elements in a raw view in which all of the data elements are selectable by a single action; allowing editing of the data elements in the raw view; outputting the data elements in a formatted view in which the data elements are output with corresponding labels; allowing editing of the data elements in the formatted view; and toggling between the raw view and the formatted view.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3A shows an interface illustrating a raw view, in accordance with another embodiment.

FIG. 3B shows an interface illustrating a formatted view, in accordance with another embodiment.

FIG. 4B shows an interface illustrating a formatted view for a multi-line entry field, in accordance with one embodiment.

DETAILED DESCRIPTION

Figure 1:
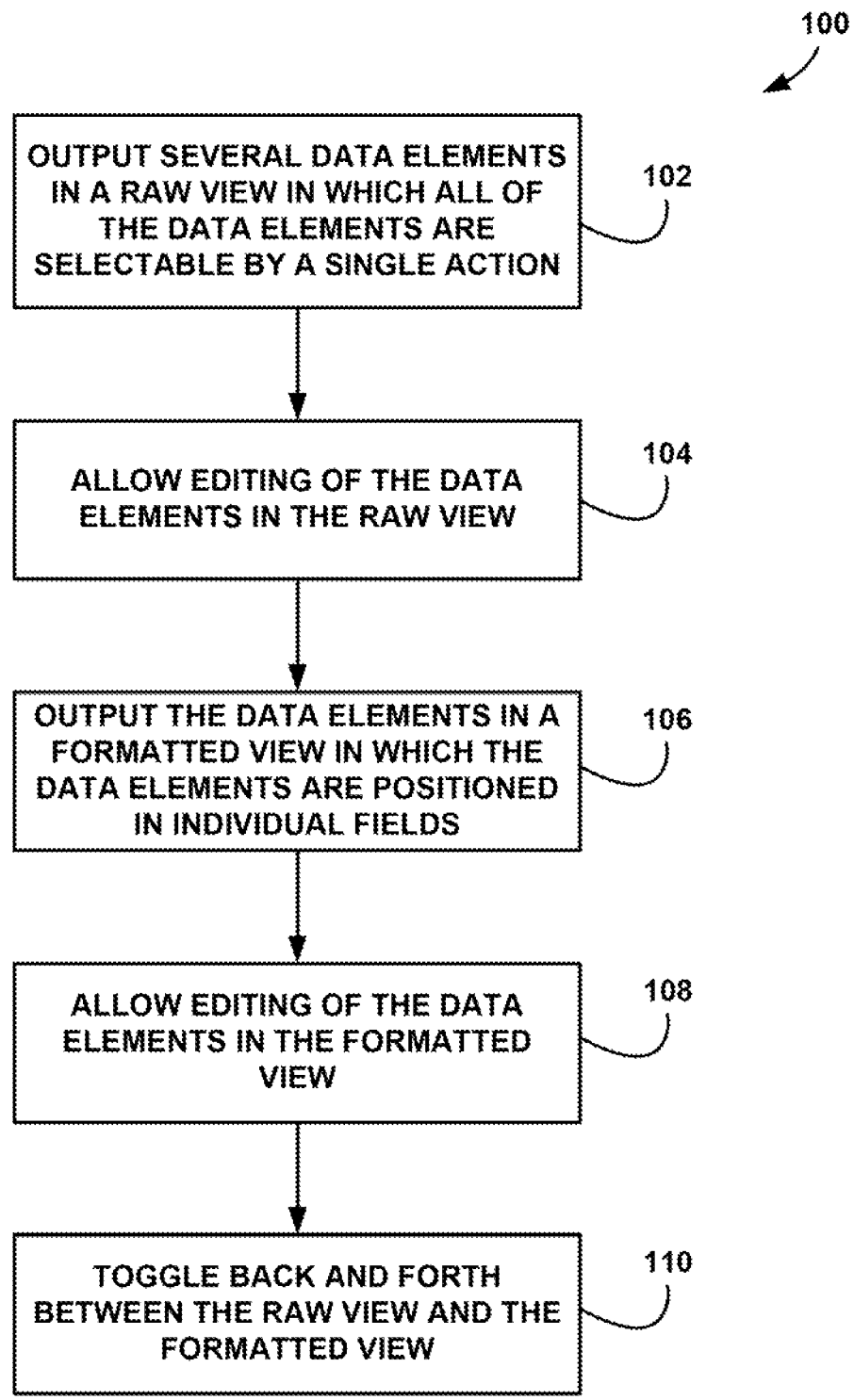
FIG. 1 shows a method for toggling back and forth between raw and formatted editable views of data fields, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data entry methods.

In one general embodiment, a method for toggling back and forth between raw and formatted editable views of data is provided. In operation, several data elements are outputted in a raw view in which all of the data elements are selectable by a single action. Additionally, editing of the data elements is allowed in the raw view. Furthermore, the data elements are outputted in a formatted view in which the data elements are positioned in individual fields. Moreover, editing of the data elements is allowed in the formatted view. Still yet, there is toggling back and forth between the raw view and the formatted view.

In another general embodiment, a computer program product for outputting data is provided, the computer program product comprising a computer usable medium having computer usable program code embodied therewith. The computer usable program code includes computer usable program code configured to output several data elements in a raw view in which all of the data elements are selectable by a single action, computer usable program code configured to allow editing of the data elements in the raw view, computer usable program code configured to output the data elements in a formatted view in which the data elements are positioned in individual fields, computer usable program code configured to allow editing of the data elements in the formatted view, and computer usable program code configured to toggle between the raw view and the formatted view.

In another general embodiment, a method for toggling back and forth between raw and formatted editable views of data is provided. In operation, several data elements are output in a raw view in which all of the data elements are selectable by a single action. Additionally, editing of the data elements in is allowed the raw view. Furthermore, the data elements are outputted in a formatted view in which the data elements are output with corresponding labels. Moreover, editing of the data elements is allowed in the formatted view. Still yet, there is toggling between the raw view and the formatted view.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus; device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a method 100 for toggling back and forth between raw and formatted editable views of data fields, in accordance with one embodiment. As shown, several data elements are outputted in a raw view in which all of the data elements are selectable by a single action. See operation 102.

In the context of the present description, a raw view refers to an unformatted or a generally formatted view. For example, in one embodiment, the raw view may include data in a sequence that is not separated by spaces, characters, or symbols. In another embodiment, the raw view may include data in a sequence that is separated by spaces, characters, or symbols, but is capable of being formatted in another manner.

Additionally, as an option, the data elements may be output in only a single row in the raw view. As another option, the data elements may be output in multiple rows in the raw view.

The single action for selecting the data elements may include any action capable of selecting data elements. For example, in various embodiments, the selecting may include selecting the data elements with a mouse, a keyboard input, a touch screen input, or any other action. Furthermore, the data elements may include any data element, such as alphabetical and numeric characters or symbols. In one embodiment, several of the data elements may each include multiple characters selected from alphabetical and numeric characters.

Additionally, editing of the data elements is allowed in the raw view. See operation 104. The editing may include any technique of modifying, deleting from, or adding to the data elements.

Furthermore, the data elements are outputted in a formatted view in which the data elements are positioned in individual fields. See operation 106. In one embodiment, at least some of the data elements may be positioned in individual fields.

In another embodiment, groups of data elements may be positioned in a field together. For example, groups of two or more data elements may be positioned in a field together. Moreover, editing of the data elements is allowed in the formatted view. See operation 108.

Again, the editing may include any technique of modifying, deleting from, or adding to the data elements. Furthermore, the editing may include positioning the data elements in different fields. Still yet, there is toggling back and forth between the raw view and the formatted view. See operation 110.

In one embodiment, the toggling may be performed in response to detecting a single user action. The single user action may include any action capable of toggling back and forth between the raw view and the formatted view. For example, in various embodiments, the single user action may include a mouse action, a keyboard input, a touch screen input, or any other user action.

As an option, a toggle button may be output and/or displayed to a user. For example, the toggle button may be output and/or displayed as a graphic user interface (GUI) or as part of a GUI. In this case, a selection of the toggle button may be detected.

In one embodiment, one of the views, the raw view or the formatted view, may be saved as a default view. For example, the raw and the formatted view may include a window or a graphic user interface display. In this case, one of the windows may be saved as a default view. As an option, the default view may be saved as a global user preference and used throughout an application.

In one embodiment, the raw view and the formatted view may be toggled in the same graphical user interface. In other words, in various embodiments, detection of a toggle request may not cause regeneration of a new window with the other view. In these embodiments, the views may be output on the same interface.

Furthermore, the data elements in the raw view may be parsed and the parsed data elements may be placed in the fields in the formatted view. As an option, the parsing may be performed when toggling from the raw view to the formatted view. In this way, control for toggling formatted and unformatted editable views of complex data fields may be provided. This may be utilized in the context of many environments.

For example, data entry in technical applications, such as those used by an IT administrator, often involve entering fields with complex formatting. This complex formatting may include IP addresses, operating system installation keys, software license keys, and various other data. In the context of IP addresses, the internet protocol version 6 (IPv6) addressing scheme may add enormous complexity to machine addressing and greatly increase the chance for human error when entering these addresses into software applications that use them.

In some cases, users may realize this potential for error and, when possible, utilize an operating system clipboard to copy and paste IPv6 addresses into an application. However, the type of user interface controls implemented may not always allow pasting in an entire address. For example, if a separate text box is used for each octet of an IP address, this design may force the user to manually key in each value. If, on the other hand, a single text box is used, pasting in a value is possible at the expense of readability and may not afford the most effective manual data entry.

Accordingly, a software application may implement the method 100 to provide dual views and formats for these types of data. Furthermore, such software application may intelligently parse out the data from the raw view to display in the formatted view, allow the user to toggle between the two views, and to edit the data in either view. A user may input data manually and/or paste the data and toggle between the two techniques of input.

As noted above, this toggling may be performed with a single user action, such as a button click. In this way, a raw, text oriented view may allow the copying and pasting of text all at once, whereas the user might otherwise have to key in each individual field value to the application or copy each individual field value out of an application. The more formatted view may afford better readability of individual fields and may allow for easier editing of individual fields if they desire to key in data manually. This also allows for a hybrid type of data entry where the user may paste in some data, toggle to the formatted view, and complete data entry of the remaining fields.

Figure 2A:
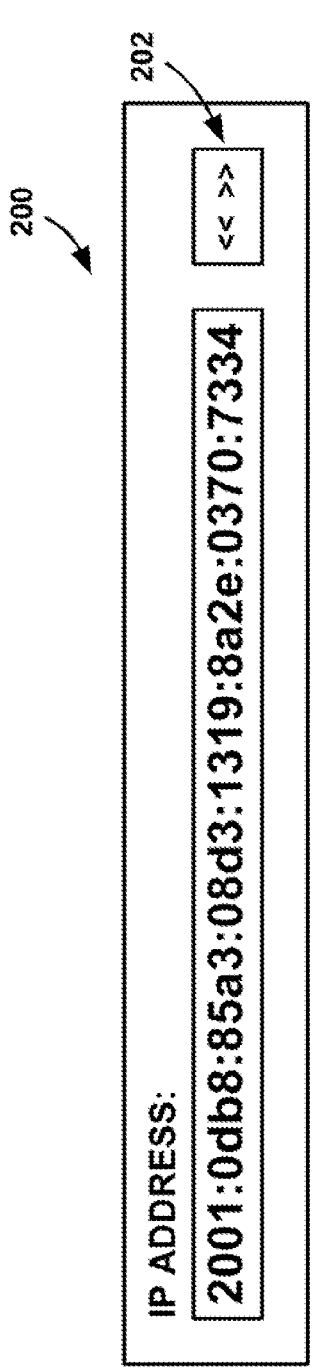
FIG. 2A shows an interface illustrating a raw view, in accordance with one embodiment.

FIG. 2A shows an interface 200 illustrating a raw view, in accordance with one embodiment. As an option, the present interface 200 may be implemented in the context of the functionality of FIG. 1. Of course, however, the interface 200 may be implemented in any desired environment.

As shown, the interface 200 is utilized in the context of IP addresses. It should be noted that IP addresses are only one example of data that may be used in the context of the interface 200. In various other embodiments, any data may be utilized, such as a license key, a mail address, and/or other data.

In operation, a user may enter an IPv6 address into the raw text view. This may be accomplished utilizing a copy and paste operation, for example. As another option, the user may manually enter the IPv6 address.

A toggle action may then be initiated by selecting a button 202 located on the interface 200. In another embodiment, however, this toggle action may also be accomplished using a specific key or key combination, for example.

In this case, when the user clicks the button 202 and initiates the toggling, computer code may be utilized to determine that data input in the interface 200 is an IPv6 address. At this point, the address may be formatted. For example, the address may be expanded appropriately.

The toggle action may be generic and may function to expand/collapse the address regardless of the IP address type. This formatted data may then be displayed as a formatted view.

Figure 2B:
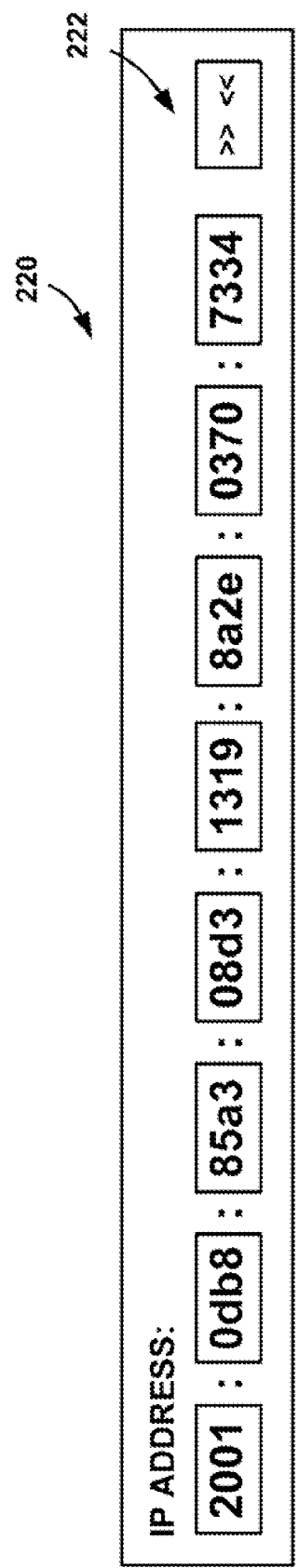
FIG. 2B shows an interface illustrating a formatted view, in accordance with one embodiment.

FIG. 2B shows an interface 220 illustrating a formatted view, in accordance with one embodiment. As an option, the present interface 220 may be implemented in the context of the functionality and architecture of FIGS. 1-2A. Of course, however, the interface 220 may be implemented in any desired environment.

As shown, the IPv6 address has been expanded and displayed in the formatted view. As shown further, a button 222 may be provided to toggle between the formatted view and the raw view. In this case, the button 222 may be the same button used to toggle from the raw view to the formatted view (e.g. the button 202 of FIG. 2A, etc.).

In another embodiment, the button 222 may be a different button than the button used to toggle from the raw view to the formatted view. Furthermore, the formatted view may be included in the same window as the raw view. For example, the toggling may include changing the display in the same window.

In another embodiment, the formatted view and the raw view may be displayed in separate windows. In still another embodiment, the toggling may include toggling between different tabs in the same window. In this case, one tab may include a raw view tab and another tab may include a formatted view tab.

FIG. 3A shows an interface 300 illustrating a raw view, in accordance with another embodiment. As an option, the present interface 300 may be implemented in the context of the functionality and architecture of FIGS. 1-2B. Of course, however, the interface 300 may be implemented in any desired environment.

As shown, the interface 300 is utilized in the context of another IP address. It should be noted that the interface 300 may represent the same interface illustrated in FIG. 2A. Thus, the raw view and associated interface may be generalized such that any type of data may be entered into the same interface.

In operation, a user may enter an IP address into the raw text view. A toggle action may then be initiated by selecting a button 302 located on the interface 300. In another embodiment, however, this toggle action may also be accomplished using a specific key or key combination, for example.

In this case, when the user clicks the button 302 and initiates the toggling, computer code may be utilized to determine that data input in the interface 300 is an IP address. At this point, the address may be formatted. In one embodiment, this formatted data may then be displayed as a formatted view 320 as illustrated in FIG. 3B.

As shown, the IP address is expanded and displayed in the formatted view 320. As shown further, a button 322 may be provided to toggle between the formatted view and the raw view. In this case, the button 322 may be the same button used to toggle from the raw view to the formatted view (e.g. the button 302 of FIG. 3A, etc.).

As another example implementation, some ecommerce sites may save a mail address and show the easier-to-read cleaner format as view only, which forces the user to go to another page to make edits. By implementing the techniques described above, a surfaced toggle button may be used in conjunction with parsing and logic to switch between formats (e.g. a segmented and free form, etc.). In this way, a user may conveniently stay in the same base user interface panel and switch between formats. The default format may be a low/no format to make it be easier to paste into and to use less space.

Figure 4A:
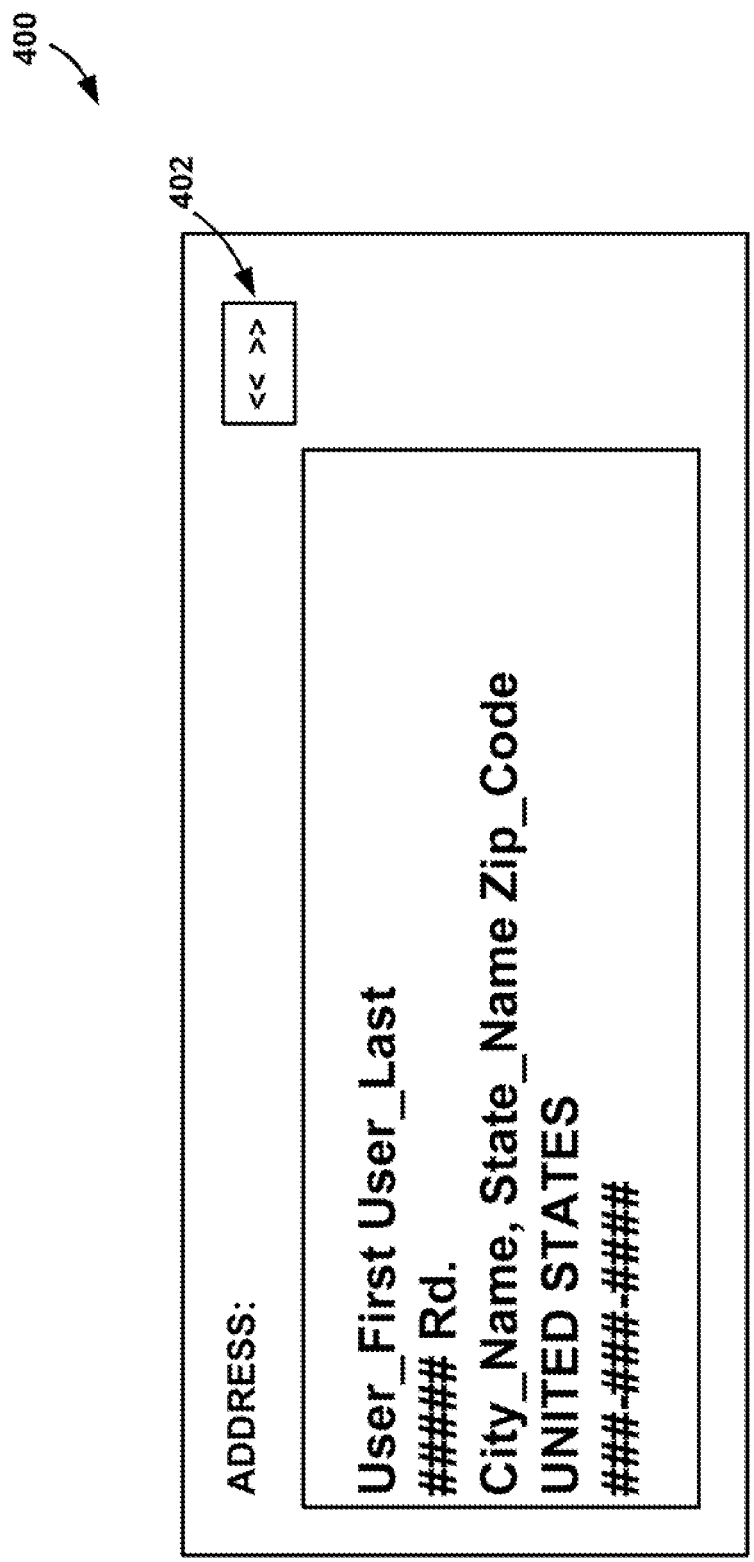
FIG. 4A shows an interface illustrating a raw view for a multi-line entry field, in accordance with one embodiment.

FIG. 4A shows an interface 400 illustrating a raw view for a multi-line entry field, in accordance with one embodiment. As an option, the present interface 400 may be implemented in the context of the functionality and architecture of FIGS. 1-3B. Of course, however, the interface 400 may be implemented in any desired environment.

Figure 4B:
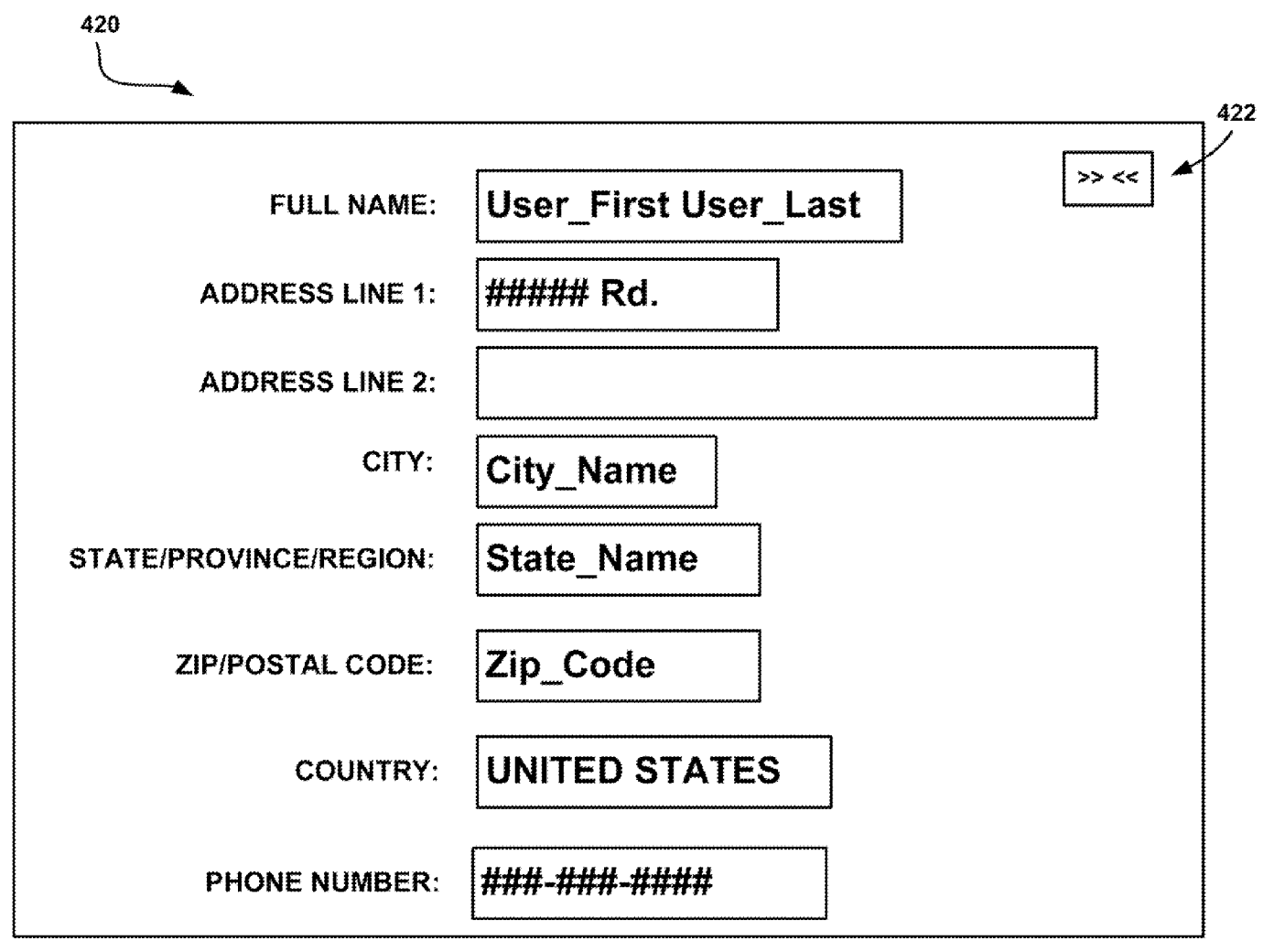

As shown, the input area of the raw view interface 400 includes a multi-line entry field. In operation, a user may enter information into the raw view. A toggle action may then be initiated by selecting a button 402 located on the interface 400. The information may then be parsed and output into a formatted view, as shown in FIG. 4B.

As shown, the multi-line address has been expanded and displayed in the formatted view interface 420. As shown further, a button 422 may be provided to toggle between the formatted view and the raw view. In this case, the button 422 may be the same button used to toggle from the raw view to the formatted view (e.g. the button 402 of FIG. 4A, etc.).

In this way, several data elements may be outputted in a raw view in which all of the data elements are selectable by a single action, where editing in the raw view is permitted. The data elements may then be outputted in a formatted view in which the data elements are output with corresponding labels, where the formatted view also allows editing. In this case, the data elements may be output in fields in the formatted view, as shown in FIG. 4B.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving input of several data elements from a user in a raw view;
   outputting the several data elements in the raw view in which all of the data elements are selectable by a single action;
   allowing editing of the data elements in the raw view;
   outputting the data elements in a formatted view in which the data elements are positioned in individual fields;
   allowing editing of the data elements in the formatted view;
   toggling back and forth between the raw view and the formatted view in response to detecting a single user action.

2. A method as recited in claim 1, further comprising:
   outputting a toggle button;
   detecting selection of the toggle button;
   in response to selection of the toggle button a first time:
      determining a format of the data elements;
      parsing the data elements in the raw view; and
      placing the parsed data elements in the fields in the formatted view; and
   in response to selection of the toggle button after the first time:
      toggling back and forth between the raw view and the formatted view,
   wherein several of the data elements each include multiple characters selected from alphabetical and numeric characters.

3. A method as recited in claim 1, further comprising outputting a toggle button, wherein selection of the toggle button is detected and whereupon detecting selection of the toggle button a first time, a format of the data elements is determined.

4. A method as recited in claim 1, wherein one of the views is saved as a default view.

5. A method as recited in claim 1, further comprising parsing the data elements in the raw view and placing the parsed data elements in the fields in the formatted view.

6. A method as recited in claim 1, wherein the data elements are output in only a single row in the raw view.

7. A method as recited in claim 1, wherein the data elements are output in multiple rows in the raw view.

8. A method as recited in claim 1, wherein the raw view and formatted view are toggled in the same graphical user interface.

9. A computer program product for outputting data, the computer program product comprising:
- a non-transitory computer usable medium having computer usable program code embodied therewith, the computer usable program code comprising:
  - computer usable program code configured to receive input of several data elements from a user in a raw view;
  - computer usable program code configured to output the several data elements in the raw view in which all of the data elements are selectable by a single action;
  - computer usable program code configured to allow editing of the data elements in the raw view;
  - computer usable program code configured to output the data elements in a formatted view in which the data elements are positioned in individual fields based on the format of the data elements;
  - computer usable program code configured to allow editing of the data elements in the formatted view;
  - computer usable program code configured to toggle between the raw view and the formatted view; and
  - computer usable program code configured to detect selection of a toggle button for toggling between the raw view and the formatted view, whereupon detecting selection of the toggle button, the format of the data elements is determined.

10. The computer program product as recited in claim 9, further comprising:
- computer usable program code configured to output a toggle button;
- computer usable program code configured to detect selection of the toggle button;
- computer usable program code configured to, in response to selection of the toggle button a first time:
  - determine a format of the data elements;
  - parse the data elements in the raw view; and
  - place the parsed data elements in the fields in the formatted view,
- wherein the raw view and the formatted view are toggled in response to selection of the toggle button after the first time.

11. A method, comprising:
- outputting several data elements in a raw view in which all of the data elements are selectable by a single action;
- allowing editing of the data elements in the raw view;
- determining a format of the data elements in the raw view;
- outputting the data elements in a formatted view based on the format of the data elements in which the data elements are output with corresponding labels;
- allowing editing of the data elements in the formatted view; and
- toggling between the raw view and the formatted view in response to detecting a single user action.

12. A method as recited in claim 11, further comprising outputting a toggle button, wherein selection of the toggle button is detected, and whereupon detecting selection of the toggle button a first time, the format of the data elements is determined.

13. A method as recited in claim 11, further comprising receiving input of the several data elements from a user in the raw view, wherein one of the views is saved as a default view.

14. A method as recited in claim 11, wherein the data elements are output in multiple rows in the raw view, and wherein the editing the data elements includes an action chosen from a group consisting of: modifying the data elements, deleting from the data elements, and adding to the data elements.

15. A method as recited in claim 11, wherein the data elements are output in fields in the formatted view.

16. A method as recited in claim 15, further comprising parsing the data elements in the raw view and placing the parsed data elements in the fields in the formatted view.

17. A method, comprising:
- receiving input of several data elements from a user in a raw view;
- outputting the several data elements in the raw view in which all of the data elements are selectable by a single action;
- allowing editing of the data elements in the raw view;
- determining a format of the data elements in the raw view;
- parsing the data elements in the raw view and placing the parsed data elements in individual fields in a formatted view;
- outputting the data elements in the formatted view;
- allowing editing of the data elements in the formatted view;
- outputting a toggle button, wherein selection of the toggle button is detected and whereupon detecting selection of the toggle button a first time, the format of the data elements is determined, the data elements are parsed in the raw view, and the parsed data elements are placed in the fields in the formatted view; and
- toggling back and forth between the raw view and the formatted view in response to detecting selection of the toggle button after the first time,
- wherein several of the data elements each include multiple characters selected from alphabetical and numeric characters,
- wherein one of the views is saved as a default view, and
- wherein the raw view and formatted view are toggled in the same graphical user interface.

* * * * *